March 1, 1966  H. L. DOBRIKIN  3,237,995
SERVICE AND EMERGENCY BRAKE SYSTEM
Filed Feb. 26, 1964

INVENTOR.
Harold L. Dobrikin,
BY Parker & Carter
Attorneys.

900
United States Patent Office 3,237,995
Patented Mar. 1, 1966

3,237,995
SERVICE AND EMERGENCY BRAKE SYSTEM
Harold L. Dobrikin, Highland Park, Ill., assignor, by mesne assignments, to Berg Mfg. & Sales Co., Des Plaines, Ill., a corporation of Illinois
Filed Feb. 26, 1964, Ser. No. 347,544
2 Claims. (Cl. 303—9)

This invention relates to vehicle brake pressure systems and has particular relation to simplified brake pressure systems having manually operable means for applying the brakes of the vehicle under a variety of conditions and for thereafter selectively releasing said brakes.

Another purpose is to provide a vehicle brake pressure system operable through a minimum effort of the vehicle operator.

Another purpose is to provide a vehicle brake pressure system automatically effective to apply an emergency brake upon diminution of the main or service pressure in the system.

Another purpose is to provide a vehicle brake system having parts operable manually to both apply and release an emergency spring brake actuator.

Another purpose is to provide a vehicle brake pressure system having a main and auxiliary reservoir with means for insuring automatic charging of the auxiliary reservoir.

Another purpose is to provide a vehicle brake pressure system effective to both apply and release an emergency spring brake actuator through employment of pressure from an auxiliary reservoir alone.

Another purpose is to provide a vehicle brake pressure system capable of employment with either a dead-man or a two-piston control valve.

Another purpose is to provide a vehicle brake pressure system effective to preclude accumulative normal and emergency brake actuation forces.

Another purpose is to provide a vehicle brake pressure system in which the presence of normal service pressure in the system is effective automatically to maintain emergency spring brake actuators in release position.

Other purposes will appear from time to time during the course of the specification and claims.

The invention is illustrated more or less diagrammatically in the accompanying drawings wherein.

Like parts are indicated by like numerals throughout the specifification and drawings.

Figure 1:
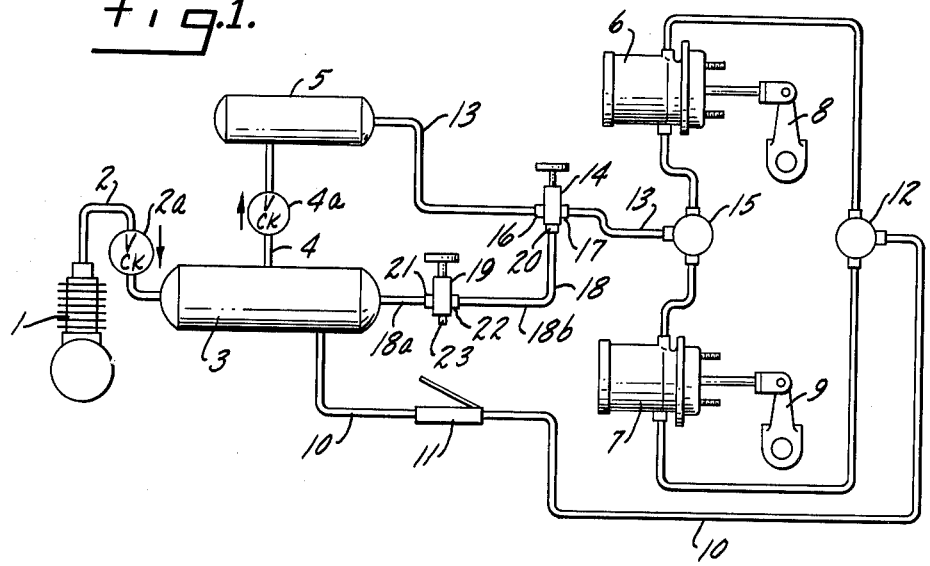
FIGURE 1 is a schematic representation of the system of the invention.

Referring now to the drawings, and particularly to FIGURE 1, the numeral 1 designates a pressure generating mechanism such as a conventional compressor normally carried, for example, by the tractor-trailer vehicle combination to which the invention is particularly applicable. The compressor communicates, through fluid pressure conduit 2 and check valve 2a, with a main or service fluid pressure supply or reservoir 3. The reservoir 3 communicates, through a fluid pressure conduit 4 and check valve 4a, with an independent or protected auxiliary or emergency fluid pressure supply or reservoir 5.

Spring brake actuators 6, 7 are operatively connected with brake elements such as the slack adjuster arms 8, 9, respectively. While two actuators 6, 7 are illustrated, it will be understod that the number of actuators may be varied without departing from the nature and scope of the invention. The actuators 6, 7 include a main or service fluid pressure operable element effective to actuate the adjusters 8, 9 to apply the brakes in response to delivery of normal or service fluid pressure thereto. The actuators 6, 7 also include a second fluid pressure-responsive element and yielding means, such as a powerful spring, effective to actuate adjusters 8, 9 through the second flluid pressure-responsive element, the spring being held compressed and the second fluid pressure-responsive element being held in release position by fluid pressure. While the detail structural design of the actuators 6, 7 forms no part of the present invention, reference may be had to United States Letters Patent 3,117,496, for example, for an understanding of a suitable actuator of the type represented at numerals 6, 7.

A service pressure conduit 10 communicates the main reservoir 3, through a brake application valve 11 and a quick release valve 12, with the service inlets of actuators 6, 7 for employment against the first fluid pressure-responsive element therein to move the same and to actuate adjusters 8, 9 to apply the brakes of the vehicle in normal operation.

An auxiliary fluid pressure conduit 13 communicates the independent auxiliary reservoir 5, through an emergency brake release valve 14 and a second quick release valve 15, with the emergency release inlets of actuators 6, 7 to apply fluid pressure from the tank 5 against the second fluid pressure-responsive element in the actuators 6, 7 and to hold the same, against the action of spring forces therein, in release position.

The emergency release valve 14 has an inlet 16 and an outlet 17, the inlet 16 communicating with independent auxiliary tank 5, the outlet 17 communicating with brake release valve 15 and, through valve 15, with the actuators 6, 7.

A branch or transfer conduit 18 communicates the main tank or reservoir 3, through an emergency applicator valve 19, with the valve 14 as indicated at passage 20. The valve 19 has an inlet 21 communicating with tank 3 through an upstream portion 18a of conduit 18, and an outlet 22 communicating through a downstream portion 18b of conduit 18 with valve 14 through the passage 20 therein. The valve 19 has an exhaust outlet 23. As will be seen hereinbelow, conduit portion 18b serves a two-way communication function.

While the specific detailed structural designs of the valves 14, 19 form no direct part of the present invention, it will be understood that valve 14 includes a housing, a valve element in said housing and manually operable means for actuating said valve extending outwardly of said housing, said valve element being movable within said housing to communicate, in one position, inlet 16 with outlet 17 and, in another position, to communicate outlet 17 with two-way passage 20 and thus to communicate the outlet 17 with outlet 22 of valve 19 through conduit portion 18b. It will also be understood that the valve 14 is effective to insure that either of the two positions described is occupied by the valve element therein and that said valve element in its one position precludes communication between outlet 17 and passage 20 and in its other position precludes communication between outlet 17 and inlet 16. The valve 14 may be arranged to cause the valve element therein to remain in either of the two positions described when placed in either of said positions. Alternatively, a yielding means may be provided for insuring that the valve 14 will return to a predetermined position following operation and release of the manual operable means thereof, the latter configuration being known as the dead-man type valve. For an understanding of the structural design of a suitable type valve useful as the valve 14, reference may be had to United States Letters Patent 3,096,789, it being understood that the exhaust outlet disclosed therein would constitute the passage 20 of valve 14 arranged for communication with conduit portion 18b.

The valve 19 may be substantially identical with the valve 14, it being understood that the valve 19 will include a housing, a valve element in said housing and manually operable means extending outwardly of said housing for operation of said valve element between one position placing inlet 21 in communication with outlet 22, and another position placing outlet 22 in communication with exhaust outlet 23. For an understanding of the structural design of a valve suitable for use as valve 19, reference may again be had to United States Letters Patent 3,096,789.

Figure 2:
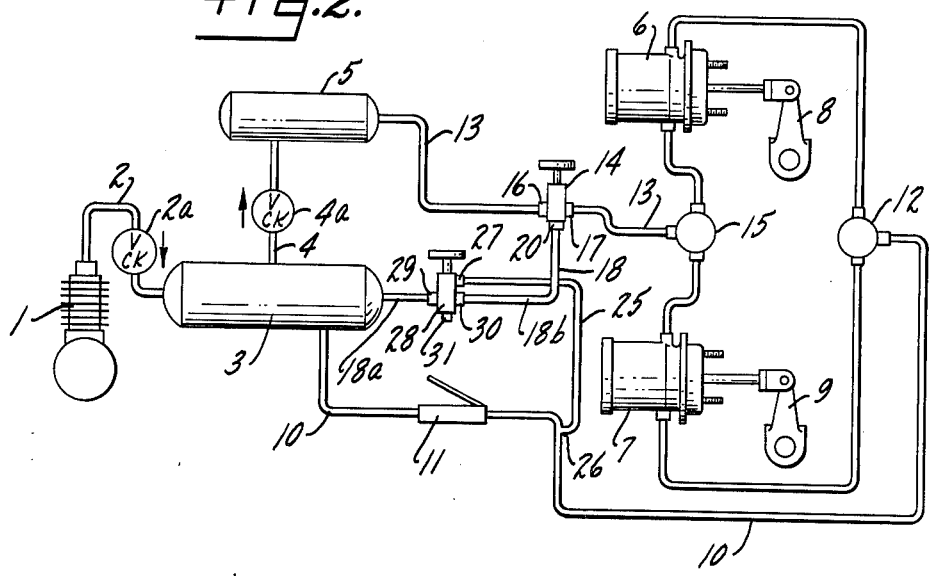
FIGURE 2 is a schematic representation of a variant form of the invention.

Referring now to FIGURE 2 of the drawings, it will be observed that the system therein illustrated includes a number of elements identical with those numbered and described above. Accordingly, for clarity and convenience, identical elements of the system shown in FIGURE 2 are given the numbers applied thereto in FIGURE 1. The system of FIGURE 2, however, includes a second branch or transfer conduit 25 communicating with the line 10, as at 26, downstream of application valve 11 and communicating with an inlet 27 of an emergency actuator control valve 28. The valve 28 has an inlet 29 communicating through conduit portion 18a with main reservoir 3 and an outlet 30 communicating with passage 20 of valve 14 through conduit portion 18b. The valve 28 has an exhaust outlet 31. While the specific detailed structural design of the valve 28 forms no part of the present invention, it will be understood that the valve 28 includes a housing, a valve element in said housing and manually operable means extending outwardly of said housing for moving said valve element between one position communicating inlet 29 with outlet 30 and another position communicating the outlet 30 with exhaust outlet 31. The valve 28 also includes auxiliary means for moving said valve element in response to pressure entering valve 28 through inlet 27. The fluid pressure-responsive means for moving the valve element in housing 28 is positioned to move said valve element into said one position in response to fluid pressure entering at inlet 27, thus communicating inlet 29 with outlet 30 and delivering fluid pressure from main reservoir 3 to valve 14 through passage 20 therein. For an understanding of the structural design of a valve suitable for use as valve 28, reference may be had to United States Letters Patent No. 3,109,455.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

Referring to the system illustrated in FIGURE 1, the emergency spring actuators within chambers 6, 7 are held normally in brakes-off or release position by fluid pressure from the main tank 3 passing through inlet 21 and outlet 22 of valve 19, passage 20 and outlet 17 of valve 14 and quick release valve 15 into the chambers 6, 7. The independent auxiliary tank 5 is thus normally rendered independent and held out of the system. When it is desired to actuate the emergency spring-operated means in actuators 6, 7, it is necessary only for the vehicle operator to manipulate the manually operable means of valve 19 to reposition the valve element therein, cutting off communication between inlet 21 and outlet 22 and opening communication between outlet 22 and exhaust outlet 23. Thereupon fluid pressure is evacuated or exhausted to atmosphere from the second fluid-responsive element in chambers 6, 7 through release valve 15, outlet 17 and passage 20 of valve 14, two-way conduit portion 18b, outlet 22 and exhaust outlet 23 of valve 19. Immediately thereupon the springs in actuators 6, 7 are free and effectively move adjusters 8, 9, to apply the brakes of the vehicle. Thus the valve 19 is the sole element required to be operated by the vehicle operator to apply the emergency brakes of the vehicle to park the vehicle or to bring the vehicle to a stop under emergency conditions.

Similarly, the valve element in valve 19, when positioned in its position communicating inlet 21 with outlet 22, is held in said position by fluid pressure flowing from tank 3. Upon failure of fluid pressure in tank 3 the valve element of valve 19, under yielding means provided therein, is moved into its other position communicating outlet 22 with outlet 23 and thus exhausting the chambers 6, 7 of emergency fluid pressure and freeing the springs therein to apply the brakes of the vehicle automatically upon diminution of pressure within main tank 3 below a predetermined valve. It has been found preferable, for example, to set such value at approximately 35 p.s.i.

In normal operation of the system the application valve 11, which is normally arranged for operation by the foot of the vehicle operator, directs pressure from the main tank 3 through release valve 12 to the normal or service side of the actuators 6, 7 to apply the brakes of the vehicle through adjusters 8, 9.

Thus the operator may alternately apply and release the emergency brake actuators of the vehicle by the movement of the manual operable means of valve 19 alone. By moving the valve element in valve 19 to its first position, the emergency spring brakes are released by pressure supplied from tank 3. By moving said valve element to its second position, the actuators 6, 7 are exhausted through outlet 23 and the springs therein apply the brakes of the vehicle.

In the event that fluid pressure is not available at source 3 and the spring brakes have been thus applied to the vehicle, it may occur that a need exists to move the vehicle, for example, out of a danger-creating location. It then becomes necessary to release the spring brakes of the vehicle to permit its movement to a safe location. Such release is accomplished, with the system of the invention illustrated in FIGURE 1, by the manipulation of a single device by the vehicle operator. In this case the manual operable means of the valve 14 is moved by the operator to move the valve element of valve 14 from its normal position communicating outlet 17 with passage 20 into a second or brakes-releasing position communicating inlet 16 with outlet 17. Upon movement of the valve element into said second postion, fluid pressure is supplied by independent auxiliary tank 5 through line or conduit 13, inlet 16 and outlet 17 and through quick release valve 15 to the second fluid-responsive element of actuators 6, 7 to move the same against the springs therein and thus to release the brakes of the vehicle. Thus the tank 5 is maintained available for release of the emergency brakes as required. The tank 5 will be assured of initial charging to a predetermined level through check valve 4a and the line 4 communicating the check valve with main reservoir 3 and tank 3 will maintain pressure in tank 5 so long as pressure is maintained in tank 3. The valve 14 may have incorporated therein suitable means for yielding urging the valve element therein toward a position maintaining outlet 17 in communication with passage 20.

Thus the emergency chambers 6, 7 will be vented, and the springs therein allowed to apply the brakes whenever the valve 19 is in its exhaust position, i.e. outlets 22 and 23 are placed in communication, either by intentional manual operation of valve 19 by the operator or by a diminution of pressure in main tank 3. So long as pressure remains above a predetermined level in tank 3, the valve 19 may be manually operated to release the emergency brake actuators 6, 7, the valve element in valve 19 being positioned to place inlet 21 in communication with outlet 22. With pressure absent in tank 3 the valve 14 is manipulated, as above described, to employ pressure available in tank 5 to release the emergency brakes in actuators 6, 7. Thus the vehicle operator is able to apply the emergency spring brakes by operation of valve 19 alone. The vehicle operator is enabled to release the emergency spring brakes of chambers 6, 7 by manipulation of either one of valves 14 or 19 when tank 3 contains pressure above a predetermined level and the vehicle operator is enabled to release the brakes of chambers 6, 7 by manipulation of valve 14 alone when the pressure in tank 3 is below a predetermined level. With sufficient pressure in tank 3 the operator may alternately, continuously apply and release the emergency brakes of chambers 6, 7 by manual operation of valve 19 alone. With the pressure in tank 3 below a satisfactory predetermined level the operator may alternately apply and release the emergency brakes of chambers 6, 7 by manual operation of valve 14 alone, so long as sufficient pressure remains in tank 5. Thus the operator is at no time required to operate more than one control valve in order to obtain the desired operation of the system of the invention and to control the brakes of the vehicle as desired.

The system of FIGURE 2 includes elements effective to insure release of spring forces in the emergency segments of actuators 6, 7 whenever the application valve 11 is actuated. Upon actuation of valve 11 by the vehicle operator to apply the normal service brakes, fluid pressure is delivered from tank 3 through line 10 downstream of valve 11. Said fluid pressure, as indicated at 26, passes through branch or transfer conduit 25 to inlet 27 of valve 28. Fluid pressure entering valve 28 at inlet 27 insures positioning of the valve element in valve 28 into a position communicating inlet 29 with outlet 30 of valve 28 and thus transmitting fluid pressure from main tank 3 through line 18 and through passage 29 and outlet 17 of valve 14 to release valve 15 and thence to the emergency fluid pressure-responsive elements in actuators 6, 7 to compress the emergency actuating springs therein and to move to or hold the emergency brake actuating elements toward or in release position. Fluid pressure passing connection 26 in line 10 is delivered to the normal service operating elements of actuators 6, 7 to apply the brakes of the vehicle in the normal manner. Thus is insured the prevention of accumulative service and spring brake forces in actuators 6, 7 and the consequent wear and damage potential to adjusters 8, 9 and other operating portions of the brake system. The system of FIGURE 2 operates to apply the emergency spring brakes of actuators 6, 7 automatically in response to diminution of main reservoir pressure below a predetermined level. The valve 28 includes a valve element normally held in a position communicating inlet 29 with outlet 30, the pressure flowing from tank 3 aiding in holding the valve element in said position. In said position, as above described, pressure from tank 3 is delivered to actuators 6, 7 to hold the spring brake elements in released position. Upon diminution of pressure in tank 3 below a predeterminaed level yielding means in valve 28 are effective to move the valve element into a second position in which outlet 30 is placed in communication with exhaust outlet 31, whereupon fluid pressure in the spring brake section of actuators 6, 7 is exhausted through valve 14, outlet 17 and passage 20, conduit portion 18b to outlet 30 and thence to atmosphere through outlet 31. The springs of actuators 6, 7 are immediately effective to apply the brakes of the vehicle. Similarly, the spring brakes of actuators 6, 7 can be applied by the operator of the vehicle in an emergency condition or for parking purposes by the mere manual operation of valve 28 to position the valve element therein in said second position and the operator may alternately continuously apply and release the emergency spring brakes of actuators 6, 7 by said manual operator of valve 28 so long as pressure remains in reservoir 3. In the absence of pressure in reservoir 3, fluid pressure will remain available in reserve or auxiliary tank 5. With the spring brake forces applied as a result of diminution of pressure in tank 3, the operator, in order to move the vehicle, may release the spring brake forces of actuators 6, 7 by manual operation of valve 14 to move the valve element therein into a position communicating outlet 17 with inlet 16 and thus to supply fluid pressure from auxiliary tank 5 through line 13 and release valve 15 to the pressure-responsive emergency elements of actuators 6, 7. So long as sufficient pressure remains in tank 5 the operator may alternately, continuously operate valve 14 to apply and release the emergency brakes of the vehicle.

There is claimed:

1. A pressure brake system including a first pressure source, a plurality of brake actuators, each of said actuators having a service inlet for normal pressure brake operation, a spring-operated element for emergency brake operation and a release inlet for pressure release of said spring-operated element, a first conduit communicating said first pressure source with said service inlets, an application valve in said first conduit controlling said communication, a second conduit communicating said first source with said release inlets, first and second manually operated valves arranged in series in said second conduit, said second manually operable valve having a first position communicating said first manually operable valve with said release inlets whereby said first manually operable valve controls communication between said first source and said release inlets, an auxiliary pressure source, a third conduit communicating said auxiliary pressure source with said second manually operable valve, said second manually operable valve having a second position communicating said auxiliary source with said release inlets, a fourth conduit communicating said first conduit, downstream of said application valve, with said first manually operable valve, said first manually operable valve having an element movable into position communicating said first source with said release inlets in response to fluid pressure entering said first manually operable valve from said fourth conduit.

2. A fluid pressure brake system including a first source of fluid pressure, a plurality of brake actuators, each of said actuators having a service inlet for normal brake operation, a spring-operated element for emergency brake operation and a release inlet for release of said spring-operated element, a first conduit communicating said first source with said service inlets, an application valve in said first conduit controlling said communication, a second conduit communicating said first source with said release inlets, first and second manually operable valves in said second conduit, said first manually operable valve having a first position communicating said first source with a downstream portion of said second conduit, said first manually operable valve having a second position exhausting said downstream conduit portion to atmosphere, said second manually operable valve having a first position communicating said downstream conduit portion with said release inlets, an auxiliary pressure source, a third conduit communicating said auxiliary pressure source with said second manually operable valve, said second manually operable valve having a second position communicating said auxiliary source with said release inlets, means in said second manually operable valve urging the same toward said first position whereby said first manually operable valve is enabled to control communication between said first source and said release inlets, said first manually operable valve having elements movable into said second position in response to diminution of pressure in said first source below a redetermined level whereby said second manually operable valve is enabled to apply and release said emergency brake elements, a fourth conduit communicating said first conduit, downstream of said application valve, with said first manually operable valve, said first manually operable valve being movable into said first position in response to fluid pressure entering said first manually operable valve from said fourth conduit whereby operation of said application valve insures communication between said first source and said release inlets.

References Cited by the Examiner
UNITED STATES PATENTS

| | | | |
|---|---|---|---|
| 3,011,834 | 12/1961 | Casey | 303—71 |
| 3,085,833 | 4/1963 | Schultz | 303—29 |
| 3,096,789 | 7/1963 | Horowitz et al. | 137—627.5 |
| 3,107,126 | 10/1963 | Valentine | 303—9 |
| 3,110,523 | 11/1963 | Johnson | 303—71 |

BENJAMIN HERSH, *Primary Examiner.*

EUGENE G. BOTZ, *Examiner.*